United States Patent
Carbonari

(10) Patent No.: US 7,519,790 B2
(45) Date of Patent: Apr. 14, 2009

(54) METHOD, APPARATUS AND SYSTEM FOR MEMORY INSTRUCTIONS IN PROCESSORS WITH EMBEDDED MEMORY CONTROLLERS

(75) Inventor: Steven R. Carbonari, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 11/274,686

(22) Filed: Nov. 14, 2005

(65) Prior Publication Data

US 2007/0113040 A1    May 17, 2007

(51) Int. Cl.
*G06F 12/12* (2006.01)
(52) U.S. Cl. ...................................................... 711/170
(58) Field of Classification Search ................ 711/170
See application file for complete search history.

(56) References Cited

U.S. PATENT DOCUMENTS

| | | | |
|---|---|---|---|
| 2003/0172313 A1* | 9/2003 | Jain et al. ................... | 713/300 |
| 2005/0223259 A1* | 10/2005 | Lehwalder et al. .......... | 713/330 |
| 2006/0015668 A1 | 1/2006 | Carbonari et al. | |
| 2006/0136076 A1* | 6/2006 | Rotem et al. ................... | 700/44 |
| 2006/0294149 A1* | 12/2006 | Seshadri et al. ............. | 707/200 |

OTHER PUBLICATIONS

Pending U.S. Appl. No. 11/166,880, filed Jun. 24, 2005, inventor: Seshadri et al.

\* cited by examiner

*Primary Examiner*—Hyung S Sough
*Assistant Examiner*—Hamdy S Ahmed
(74) *Attorney, Agent, or Firm*—David L. Guglielmi

(57) ABSTRACT

In some embodiments, a method, apparatus and system for memory instructions in processors with embedded memory controllers are presented. In this regard, a memory agent is introduced to configure memory coupled with a processor through a memory interface by invoking one or more processor instructions dedicated to configuring memory. Other embodiments are also disclosed and claimed.

6 Claims, 2 Drawing Sheets

METHOD, APPARATUS AND SYSTEM FOR MEMORY INSTRUCTIONS IN PROCESSORS WITH EMBEDDED MEMORY CONTROLLERS

FIELD OF THE INVENTION

Embodiments of the present invention generally relate to the field of memory controllers, and, more particularly to a method, apparatus and system for memory instructions in processors with embedded memory controllers.

BACKGROUND OF THE INVENTION

Computing devices use memory to store data and instructions. Typically, memory devices are initialized and configured by a basic input/output system (BIOS), which is code independent from the operating system (OS). When a change is made to the amount of memory, for example, the BIOS would have to interrupt the OS to configure the memory. BIOS intervention tends to reduce performance and increase complexity.

BRIEF DESCRIPTION OF THE DRAWINGS

The present invention is illustrated by way of example and not limitation in the figures of the accompanying drawings in which like references indicate similar elements, and in which.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
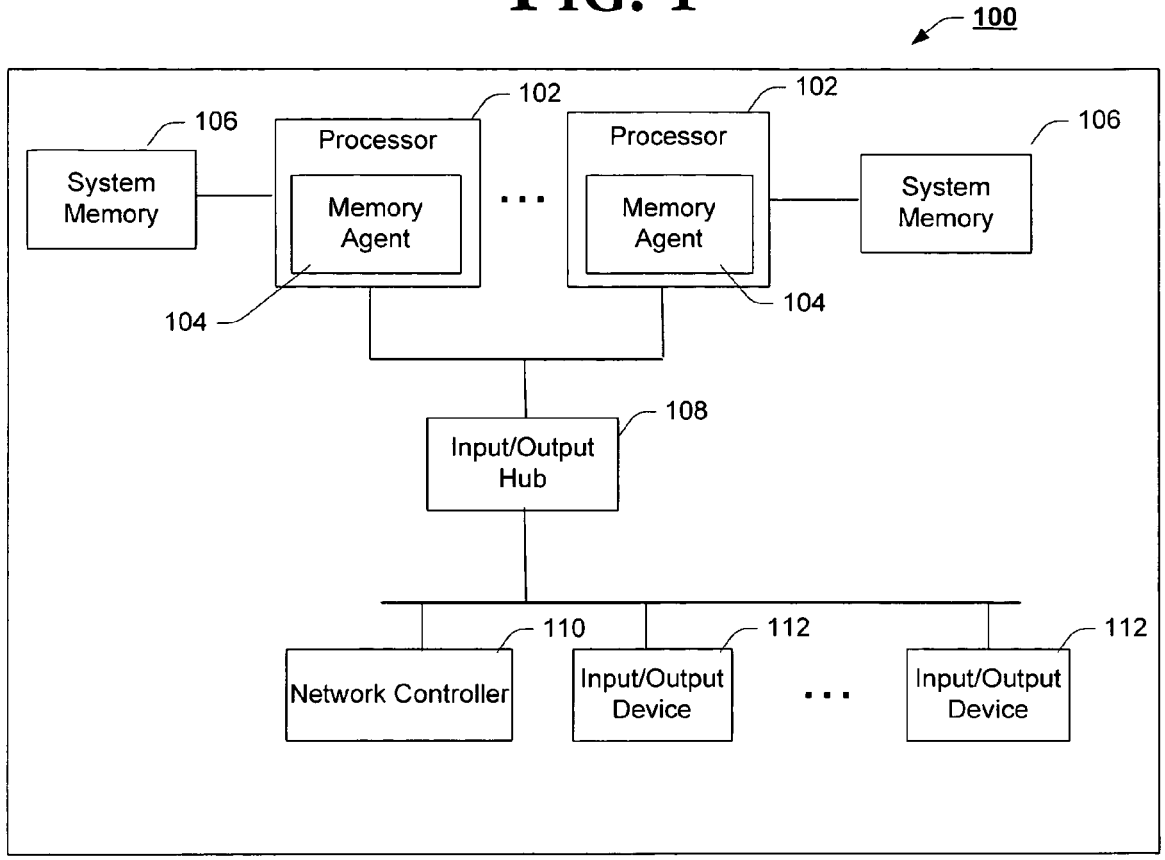
FIG. 1 is a block diagram of an example electronic appliance suitable for implementing a memory agent, in accordance with one example embodiment of the invention.

FIG. 1 is a block diagram of an example electronic appliance suitable for implementing a memory agent, in accordance with one example embodiment of the invention. Electronic appliance 100 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 100 may include one or more of processor(s) 102, memory agent 104, system memory 106, input/output hub 108, network controller 110, and input/output device(s) 112 coupled as shown in FIG. 1. Memory agent 104, as described more fully hereinafter, may well be used in electronic appliances of greater or lesser complexity than that depicted in FIG. 1.

Processor(s) 102 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, processors(s) 102 are Intel® compatible processors. Processor(s) 102 may have an instruction set containing a plurality of machine level instructions that may be invoked, for example by an application or operating system.

Memory agent 104 may have an architecture as described in greater detail with reference to FIG. 2. Memory agent 104 may also perform one or more methods to handle memory operations, such as the method described in greater detail with reference to FIG. 3.

System memory 106 may represent any type of memory device(s) used to store data and instructions that may have been or will be used by processor(s) 102. Typically, though the invention is not limited in this respect, system memory 108 will consist of dynamic random access memory (DRAM). In one embodiment, system memory 108 may consist of Rambus DRAM (RDRAM). In another embodiment, system memory 108 may consist of double data rate synchronous DRAM (DDRSDRAM).

Input/output (I/O) controller 108 may represent any type of chipset or control logic that interfaces I/O device(s) 112 with the other components of electronic appliance 100. In one embodiment, I/O controller 108 may be referred to as a south bridge. In another embodiment, I/O controller 108 may comply with the Peripheral Component Interconnect (PCI) Express™ Base Specification, Revision 1.0a, PCI Special Interest Group, released Apr. 15, 2003.

Network controller 110 may represent any type of device that allows electronic appliance 100 to communicate with other electronic appliances or devices. In one embodiment, network controller 110 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 110 may be an Ethernet network interface card.

Input/output (I/O) device(s) 112 may represent any type of device, peripheral or component that provides input to or processes output from electronic appliance 100.

Figure 2:
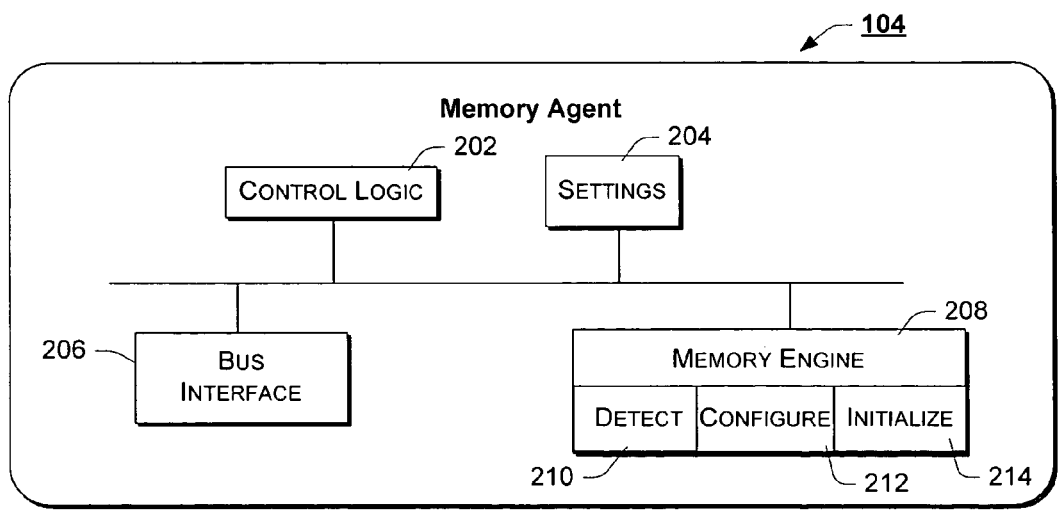
FIG. 2 is a block diagram of an example memory agent, in accordance with one example embodiment of the invention.

FIG. 2 is a block diagram of an example memory agent, in accordance with one example embodiment of the invention. As shown, memory agent 104 may include one or more of control logic 202, settings 204, bus interface 206, and memory engine 208 coupled as shown in FIG. 2. In accordance with one aspect of the present invention, to be developed more fully below, memory agent 104 may include a memory engine 208 comprising detect services 210, configure services 212 and initialize services 214. It is to be appreciated that, although depicted as a number of disparate functional blocks, one or more of elements 202-212 may well be combined into one or more multi-functional blocks. Similarly, memory engine 208 may well be practiced with more or fewer functional blocks, i.e., with only configure services 212, without deviating from the spirit and scope of the present invention. In this regard, memory agent 104 in general and memory engine 208 in particular are merely illustrative of one example implementation of one aspect of the present invention. As used herein, memory agent 104 may well be embodied in hardware, software, firmware and/or any combination thereof.

Memory agent 104 may have the ability to perform memory operations, such as reliability, availability, serviceability (RAS) operations through the use of one or more dedicated processor instructions. In one embodiment, memory agent 104 may represent operating system software that invokes the dedicated processor instructions natively, for example in response to a system management interrupt (SMI). It will occur to one skilled in the art that the present invention can be utilized for virtually any RAS operation. In this way, operations including RAID, security, and mirroring operations can be handled natively in the OS by incorporating processor based memory initialization instructions into the processor instruction set.

As used herein control logic 202 provides the logical interface between memory agent 104 and its host electronic appliance 100. In this regard, control logic 202 may manage one or more aspects of memory agent 104 to provide a communication interface from electronic appliance 100 to software, firmware and the like, e.g., instructions being executed by processor(s) 102.

According to one aspect of the present invention, though the claims are not so limited, control logic 202 may receive event indications such as, e.g., memory has been added to electronic appliance 100. Upon receiving such an indication, control logic 202 may selectively invoke the resource(s) of memory engine 208. As part of an example method for handling a memory add, as explained in greater detail with reference to FIG. 3, control logic 202 may selectively invoke detect services 210 that may detect memory modules. Control logic 202 also may selectively invoke configure services 212 and initialize services 214, as explained in greater detail with reference to FIG. 3, to configure memory interface settings and initialize memory modules, respectfully. As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein Settings 204 is intended to represent any of a wide variety of memory devices and/or systems known in the art that can store memory interface settings. According to one example implementation, though the claims are not so limited, buffer 204 may well include volatile and non-volatile memory elements, possibly random access memory (RAM) and/or read only memory (ROM). Settings 204 may include clock timing values, for example.

Bus interface 206 provides a path through which memory agent 104 can communicate with system memory 106. Memory agent 104 utilizes this interface to handle RAS operations as well as memory reads and writes, for example.

Detect services 210, as introduced above, may provide memory agent 104 with the ability to detect memory modules. Detect services 210 may encompass one or more processor instructions dedicated to the detection of memory. In one embodiment, detect services 210 may read identifying information stored on system memory 106 to determine the size of the memory modules.

Configure services 212, as introduced above, may provide memory agent 104 with the ability to configure memory interface settings. Configure services 212 may encompass one or more processor instructions dedicated to the configuration of the memory interface. In one embodiment, configure services 212 may configure settings 204 to control the memory interface based on values read from system memory 106.

Initialize services 214, as introduced above, may provide memory agent 104 with the ability to initialize memory modules. Initialize services 214 may encompass one or more processor instructions dedicated to the initialization of memory modules. In one embodiment, initialize services 214 may add new memory modules of system memory 106 to a memory map and begin utilizing the additional storage capacity.

Figure 3:
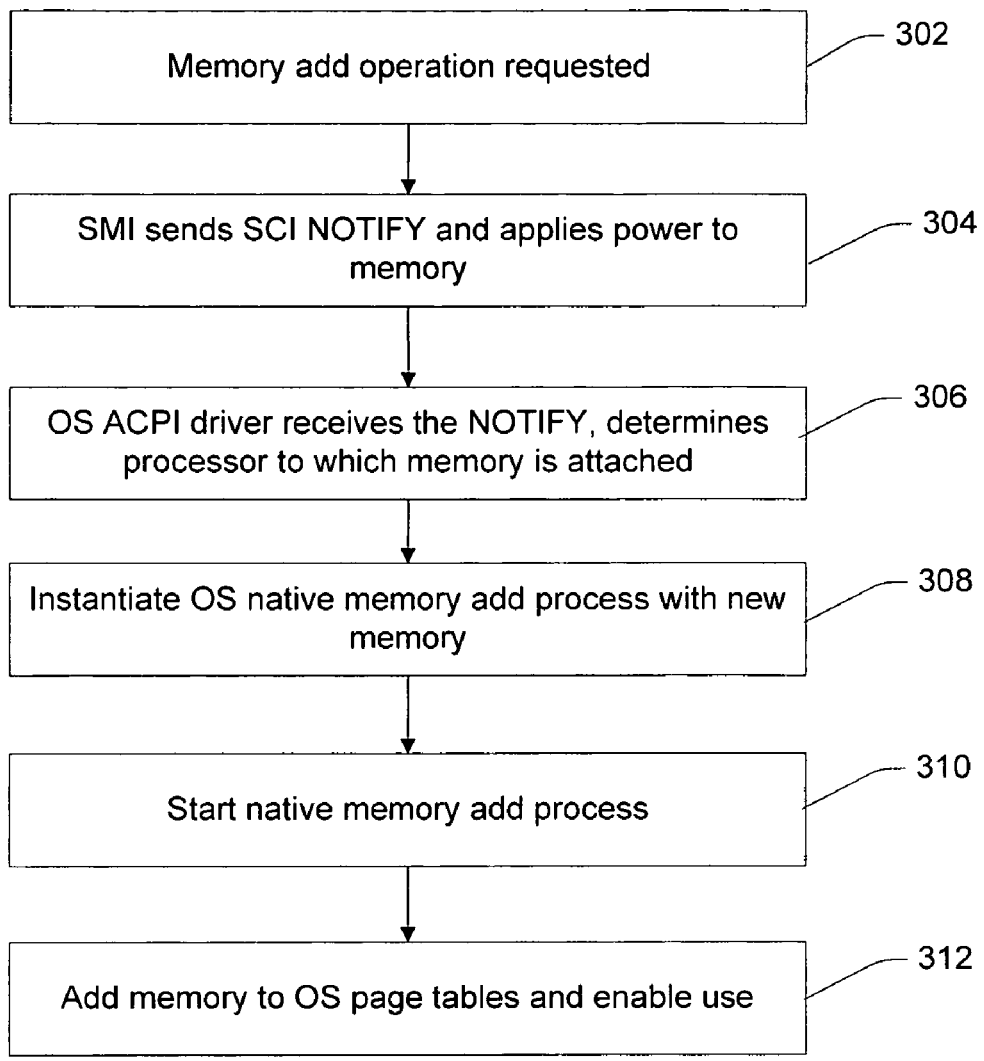
FIG. 3 is a flow chart of an example method for handling a memory add, in accordance with one example embodiment of the invention.

FIG. 3 is a block diagram of an example method for handling a memory add, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, the method of FIG. 3 begins with a request for a memory add operation (302). In one example embodiment, a user may depress an attention button which generates an SMI. Next, the SMI handler may generate a software control interrupt (SCI) to notify (304) the appropriate advanced configuration and power interface (ACPI) module device object and apply power to the memory.

The OS ACPI driver then examines the ACPI module device object to determine (306) the processor 102 to which the memory has been added. Then, the OS would instantiate (308) the native memory add process of the processor 102 to which the memory has been added.

Next, the native memory add process is started (310) and the processor based memory initialization instructions are invoked, namely detect services 210, configure services 212 and initialize services 214. Lastly, the OS adds (312) the memory to its internal memory map and page tables allowing OS processes to start using the memory.

Figure 4:
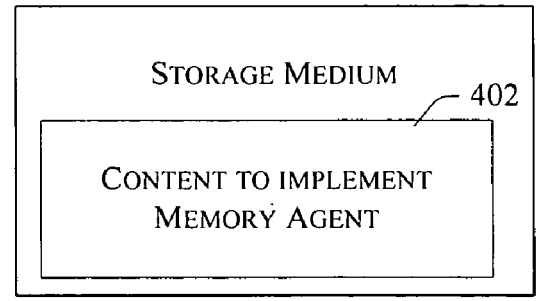
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the memory agent 104 and/or associated method 300. In this regard, storage medium 400 includes content 402 (e.g., instructions, data, or any combination thereof) which, when executed, causes the appliance to implement one or more aspects of memory agent 104, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), disk drives, computers, among other electronic components. However, it should be understood that the scope of the present invention is not limited to these examples.

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
    configuring memory coupled with a processor through a memory interface by invoking one or more native processor instructions dedicated to the configuration of memory,
    wherein the configuring of memory is done without BIOS intervention.

2. The method of claim 1, wherein an operating system configures the memory in response to a system management interrupt (SMI).

3. The method of claim 1, wherein the configuring comprises a reliability, availability, serviceability (RAS) operation.

4. A processor comprising:
    a computing unit;
    an input/output (I/O) interface;
    a memory interface; and
    a memory agent, wherein the memory agent to perform reliability, availability, serviceability (RAS) operations by invoking one or more native processor instructions dedicated to configuring memory from an operating system without BIOS intervention.

5. The processor of claim 4, further comprising the memory agent to control memory reads and writes.

6. The processor of claim 4, wherein the I/O interface comprises a peripheral component interconnect (PCI) Express interface.

* * * * *